United States Patent [19]

Oberhofer et al.

[11] 3,959,166

[45] May 25, 1976

[54] CLEANER FOR AUTOMOTIVE ENGINE COOLING SYSTEM

[75] Inventors: Alfred W. Oberhofer, Downers Grove, Ill.; James J. Benko, Griffith, Ind.; Joseph C. Drozd, Park Ridge, Ill.

[73] Assignee: Nalco Chemical Company, Oak Brook, Ill.

[22] Filed: Dec. 16, 1974

[21] Appl. No.: 533,355

[52] U.S. Cl. ............................... 252/146; 252/75
[51] Int. Cl.² ..................... C11D 7/32; C09K 15/00
[58] Field of Search ............... 252/74, 75, 180, 146, 252/387

[56] References Cited
UNITED STATES PATENTS

| | | | |
|---|---|---|---|
| 2,802,788 | 8/1957 | Flaxman | 252/181 |
| 3,079,343 | 2/1963 | Bernard | 252/75 |
| 3,342,749 | 9/1967 | Handleman | 252/146 |

*Primary Examiner*—Mayer Weinblatt
*Assistant Examiner*—Edith R. Buffalow
*Attorney, Agent, or Firm*—John G. Premo; John S. Roberts

[57] ABSTRACT

A cleaner to be used preferably in conjunction with conventional glycol-type collants in automotive cooling systems and methods of using same. The present cleaners may be referred to as extended-life cleaners which may be added to the glycol coolant and are co-extensive with the life of said glycol. These cleaners operate to dissolve deposits, minimize corrosion damage, and dissolve organic degradation products, all of which cause heat transfer difficulties. The basic cleaner comprises:
  A. An aminopolycarboxylic acid
  B. An α hydroxy acid such as gluconic, tartaric, or citric
  C. An azole copper protector such as mercaptobenzothiazole (MBT) and a monoaryl triazole such as benzotriazole or tolyltriazole wherein the above components are combined in a weight ratio ranging from 3:1:1 to 2:1:1.

An aqueous concentrate is preferred and in such a concentrate the amount of Deposit Release Agent varies from about 85–15% with a more preferred range being an aqueous concentrate which contains from 50–15% by weight of the Deposit Release Agent. The balance of such concentrate is, of course, water, preferably soft water. The aqueous concentrates above are adjusted with the water-soluble basic material to give a pH of about 7.5–12.6 with a preferred pH 7.5–10.6.

In addition to the Deposit Release Agent noted above, the following components are necessary in some of the cleaner formulations of this invention.

1. In order to emulsify in water, an oil-in-water emulsifying agent is utilized, such as Triton CF 10 (Rohm and Haas), an ethoxylated nonylphenol with an average of 9 EtO.
2. A reducing agent to reduce iron from $Fe^{+++}$ to $Fe^{++}$ is also present and a preferred reducing agent is thioglycolic acid or one of its soluble alkali metal salts.
3. Also present in some of the cleaner compositions is a polymeric dispersant which may be a water-soluble carboxylic acid polymer, a vinyl addition polymer, or carboxymethyl cellulose. A preferred polymer is the copolymer of styrene maleic anhydride and these polymers have a molecular weight of 1,000 to 1,000,000 and preferably 100,000 or less.
4. As a brightener or film former for solder an aminoalkanol is utilized preferably diethylaminoethanol.

Additionally, a minor quantity of antifoams and dyes may be used in an optional manner as indicated.

14 Claims, No Drawings

CLEANER FOR AUTOMOTIVE ENGINE COOLING SYSTEM

For many years it has been known that deposits build up on the heat transfer surfaces of automotive cooling systems. These deposits tend to reduce the heat transfer between the engine cooling jacket and the cylinders of the engine wherein combustion takes place. As deposits tend to build up and heat transfer coefficients diminish, there is a tendency for the operating temperature of the engine to increase. This increase in engine operating temperature tends to reduce the life of lubricants used in the engine as well as tending to shorten normal engine life due to the harmful effects of heat on the cylinder walls, pistons, rings, and other operating parts of the engine.

Deposits, when severe in the automotive cooling system, tend to reduce the internal passage ways of the cooling channels within the engine thereby diminishing the rate at which the coolant can dissipate heat from the cylinder walls.

These problems have long been recognized as being troublesome.

With the advent of the newer automobiles, engine operating temperatures have been increased in an attempt to reduce the hydrocarbon emission of these engines which contain, in addition to normal engine components, so-called pollution control devices which require the engine operating temperature to be elevated to higher temperatures than previously used. This increase in engine operating temperature, with a corresponding increase in the temperature of the coolant, substantially increases the problems associated with deposits forming within the cooling system. Unless heat transfer ratios can be maintained in the newer automotive engines, a substantial danger exists wherein the engine will "burn out" due to excessive heat build up within the cylinder walls, the heads, manifold, and the like.

The new cars, in addition to requiring higher engine operating temperatures, are often times equipped with auxiliary equipment such as air conditioners which again require the coolant used in the engine to efficiently cool the engine, since such devices as air conditioners place an extra load on the engine. Also, in recent years, it is customary to use as a coolant on a year-round basis a water-soluble glycol, such as ethylene glycol in combination with water as the coolant for automotive internal combustion engines.

A traditional solution to the problem of build up of deposits in automotive cooling systems is to periodically remove these deposits by the use of chemical cleaners. Typically these cleaners are acidic in nature; e.g., oxalic acid, inhibited hydrochloric acid. In some instances these cleaners contain solubilizers for hydrocarbon compounds which comprise a portion of the deposits with such solubilizers being exemplified by chlorinated hydrocarbons; e.g., dichloroethylene, perchloroethylene, and the like.

In use, the prior art inhibitors are added to the radiator of an automotive engine which is then recapped and the engine operated for a short period of time; e.g., 10-30 minutes. After this short period of engine operation, the coolant is drained. After draining, it is necessary to flush both the radiator and the engine block with copious quantities of water to remove the deposits loosened from the heat transfer surfaces and to completely neutralize the cleaning composition.

Such cleaners, while having been successfully used for many years, are extremely difficult to use in many of the newer cars. This is because many modern cars are designed to have a closed cooling system, which means that the radiator cap cannot be readily removed by the average car owner. Also, due to the large amount of extra equipment found associated with the motor such as air conditioners, cooling hoses, hydraulic hoses, and the like, the drain plug in the engine block is extremely difficult to find and open, since it is often times located in a relatively inaccessible position in relation to convenience of operation. Thus, it has become virtually impossible for the average car owner, and in certain cases mechanics, to use prior art conventional automotive cleaners.

In addition to being bothersome to use, prior art cleaners require the discarding of the old coolant to which it has been added. When such coolant contains, for example, ethylene glycol, such is of necessity lost and must be replaced with fresh ethylene glycol.

Thus, from the above discussion it is obvious that conventional approaches to engine cleaning to remove deposits is not entirely satisfactory and is almost prohibitive by the design of newer engines found in current modern cars. To remove successfully existing deposits from automotive cooling systems and engines, it is important that the nature of these deposits be understood, since they are relatively complex in nature. They may be divided into three categories.

The first category consists of scale which comes from hardness commonly found in waters used as make up for the coolant. Thus, insoluble compounds of calcium, barium, magnesium, and the like form insoluble salts, such as carbonates, silicates, phosphates, and the like, which often times form relatively tenacious scale on the heat transfer surfaces of automotive cooling systems.

The second category of deposits are in the form of corrosion products which are formed as the coolant circulates through the cooling system of the engine which always contains relatively copious quantities of oxygen, which presents to the cooling system a corrosive environment. These corrosion products are composed of a variety of oxides, metallic salts, and the like and often contain such elements as lead, iron, zinc, copper, and sometimes aluminum. These various corrosion products are occasioned by the fact that automotive cooling systems are not composed of any single metal. While the engine itself and certain portions of the radiator contain ferrous metals, other parts of the cooling system are composed of copper or copper alloys, aluminum, zinc, lead, and the like. Thus, galvanic-type cells are set up throughout the entire cooling system which further tends to increase the corrosiveness of the coolant towards the entire cooling system.

The third category of deposits are organic in nature and are composed of oils, greases and exhaust gases which always seep into the system due to the close association of the cooling system with the various lubricants used in the operation of internal combustion engines and the exhaust system. Another form of organic material which comprises the deposits of automotive cooling systems are the oxidation products of the common antifreeze; e.g., ethylene or propylene glycol used in many automobiles producing largely acid breakdown products.

Thus, it is apparent that the deposits which tend to reduce heat transfer coefficients of automotive cooling systems are complex in nature and present an extremely difficult problem from the standpoint of cleaning and prevention. The problem of corrosion deposits is also accentuated by such factors as inhibitor depletion with time and temperature.

OBJECTS OF THE INVENTION

If it were possible to devise an ideal cleaner for automotive cooling systems, it should have the following properties or characteristics.

1. The cleaner should be compatible with the various automotive coolants so that it did not interfere with their normal cooling action.
2. Once the cleaner had been added to the cooling system, it should not have to be removed from the system.
3. It should be capable of acting on all the various components that form the deposits within the cooling system.
4. The cleaner should be capable of dissolving or suspending the deposits present in an automotive cooling system to produce either solubilized deposits or deposits in the form of fine particles which would not plug surfaces of the cooling system or orifices nor which would tend to mechanically erode the moving parts of the cooling system; e.g., the water pump.
5. An ideal cleaner for automotive cooling system deposits would be a material which did not materially add to the formation of corrosion or deposit deposition and would provide a relatively non-corrosive environment; e.g., an alkaline pH.
6. An ideal cleaner would be in liquid form which could be added either directly to the radiator or to expansion chambers commonly found in newer model automobiles.
7. An additional property of an ideal cleaner would be a cleaner which was compatible with antifreeze components of many automotive coolants such as ethylene glycol, which varies in its composition with the major portion being ethylene glycol and the minor portions being the higher condensation product of ethylene glycol; e.g., polyoxyethylene glycols, certain glycol aldehydes, glycol acids, and the like. In some cases propylene glycol is used as a coolant and such a cleaner should be compatible with this freezing point depressant.
8. In addition to being compatible with the antifreeze ingredients in automotive cooling systems, an ideal cleaner would tend to allow existing inhibitors present in automotive cooling systems to more efficiently act upon metal surfaces that had been freed from deposits by the cleaner.

From the above, it is evident that an ideal cleaner for an automotive cooling system must possess many characteristics and properties and act in several ways in order to provide an all purpose cleaner which can safely be used for cleaning deposits from automotive cooling systems.

In accordance with the invention, there is provided a cleaner comprising:

A. An aminopolycarboxylic acid
B. An α hydroxy acid such as gluconic, tartaric, or citric
C. An azole copper protector such as mercaptobenzothiazole (MBT) and a monoaryl triazole such as benzotriazole or tolyltriazole.

The above components are combined in a weight ratio ranging from 3:1:1 to about 2:1:1. This composition is used in the form of an aqueous concentrate. For purposes of simplicity, the above three-component composition is referred to as a Deposit Release Agent.

The amount of Deposit Release Agent present in the form of aqueous concentrate varies from about 85–15% with a more preferred range being an aqueous concentrate which contains from 50–15% by weight of the Deposit Release Agent. The balance of such concentrates is, of course, water, preferably soft water.

The aqueous concentrates of the Deposit Release Agent are adjusted with a water-soluble basic material such as sodium hydroxide, potassium hydroxide, or the like to produce a pH within the range of 7.5–12.6, with a preferred pH range being within the range of 7.5–10.6.

THE AMINOPOLYCARBOXYLIC ACID

The aminopolycarboxylic acid of the Deposit Release Agent may be used as an alkali metal salt and is selected from Versene Na-4 (Dow Chemical—EDTA, ethylenediaminetetraacetic acid, where 4 hydrogens are replaced by sodium); Versene Fe-3 (Dow Chemical—EDTA where 3 hydrogens have been replaced by $Fe_3$); HEDTA (N-hydroxyethyl-N,N′,N′-ethylenediaminetriacetic acid); DTPA CN,N,N′,N″,N″-diethylenetriaminepentaacetic acid); and NTA (nitrilotriacetic acid). The free acid and soluble alkali metal salts may both be utilized.

The purpose of the aminopolycarboxylic acids is to slowly solubilize non-ferrous metals contained in the deposits such as lead, calcium, magnesium, zinc, and copper. Thus, the aminopolycarboxylic acid most accurately is operating on hardness deposits and corrosion products, especially of lead, zinc, and copper metals noted above which are present.

THE α HYDROXY ACID

The α hydroxy acid, which may be also described as a hydroxycarboxylic acid and in the case of citric acid as a hydroxypolycarboxylic acid, is utilized in lesser amounts than the amino acids above. The free acid and soluble alkali metal salts may both be utilized. These materials also tend to slowly solubilize the non-ferrous and ferrous metal portions of the deposits and place them into solution or in the form of a finely divided suspension.

AZOLE COPPER PROTECTOR

Also, in the Deposit Release Agent and utilized in a minor amount with respect to the aminopolycarboxylic acid above is a special azole protector for copper, which may be mercaptobenzothiazole (MBT) which is relatively slow acting and fragile, and monoaryl triazole such as benzotriazole or tolyltriazole which is selected for rapid action and filming.

In a preferred formulation, as a copper film former, a mixture of mercaptobenzothiazole (MBT) and one of the monoaryl triazoles is utilized, since the latter are more soluble and more stable. Due to the increased heat in the automotive cooling system, it has been found that greater stability is achieved by utilizing these more heat stable compounds in lieu of the more heat fragile mercaptobenzothiazole. Thus, a portion of the MBT conventionally used is retained by a split dosage with one of the monoaryl triazoles, such as tolyltriazole, and this split dosage is used to take advantage of the more rapid action of MBT in an otpimum formulation. A formulation of equiparts by weight percent of MBT and a monaryl triazole has been found especially useful.

The purpose of this material is to prevent any possible deposition of copper back onto ferrous metal surfaces which deposition would cause excessive corrosion of such surfaces due to the highly galvanic nature of such dissimilar metals in contact with each other in a corrosive aqueous environment.

OIL-IN-WATER EMULSIFIER

An important component utilized in conjunction with the Deposit Release Agent is an oil-in-water emulsifying agent. The purpose of this surfactant is to emulsify the organic components of the deposit into the aqueous coolant. By so emulsifying the organic portions of the deposit, it is possible to substantially loosen many types of deposits. By maintaining the organic portions of the deposits as an emulsion, it prevents them from replating out onto the heat transfer surfaces in forming hydrocarbon crusts which are heat insulators in nature and form localized hot spots within the system which cause possible burn out or metal deterioration. Typical of such materials are low foaming surfactants, such as Triton CF 10 (Rohm and Haas), an ethoxylated nonylphenol with an average of 9 EtO; and one or more antifoams such as Ucon Lub 50 HB–5100 (Union Carbide), which is a polyoxyalkylene glycol.

In addition to the above, minor amounts of silicone-type antifoams may be used.

REDUCING AGENT

A reducing agent may be incorporated into the formula to assist in reducing iron from $Fe^{+++}$ to the more soluble $Fe^{++}$; and to reduce transition elements, thioglycolic acid (or a similar organo mercapto carboxylic acid homolog such as mercapto propionic acid) or one of its soluble basic salts is preferred. As alternatives, other reducing agents may be substituted such as sodium thiosulfate ($Na_2S_2O_3$), sodium bisulfite ($NaHSO_3$), sodium hydrosulfite ($Na_2S_{2-4}.2H_2O$, dithionate, hyposulfite), sodium sulfite ($Na_2SO_3$), sodium sulfide, hydrazine, and stannous chloride.

POLYMERIC DISPERSANTS

The polymeric dispersants may be generically categorized, may be a water-soluble carboxylic acid polymer, and may be a vinyl addition polymer or carboxymethyl cellulose (CMC). Of the vinyl addition polymers contemplated, maleic anhydride copolymers as with vinyl acetate, styrene, ethylene, isobutylene, and vinyl ethers are preferred.

All of the above-described polymers are water-soluble or at least colloidally dispersible in water. The molecular weight of these polymers may vary over a broad range although it is preferred to use polymers having average molecular weights ranging between 1,000 up to 1,000,000. In a most preferred embodiment of the invention these polymers have a molecular weight of 100,000 or less. While higher molecular weight polymers may be used, there is no particular advantage in their utilization because they tend to be broken down due to the shear forces found in recirculating cooling systems. Also, when used in larger amounts in concentrated formulas, they produce highly viscous products that are difficult to use.

The water-soluble polymers of the type described above are often in the form of copolymers which are contemplated as being useful in the practice of this invention provided they contain at least 10% by weight of

groups where M is hydrogen, alkali metal, ammonium or other water-solubilizing radicals. The polymers or copolymers may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

In the case of carboxymethyl cellulose, cellulose is modified with chloroacetic acid to graft carboxylic acid moieties onto the cellulose backbone.

As previously stated, maleic anhydride polymers are preferred. Especially useful maleic anhydride polymers are selected from the group consisting of homopolymers of maleic anhydride, and copolymers of maleic anhydride with vinyl acetate, styrene, ethylene, isobutylene and vinyl ethers. These polymers can be easily prepared according to standard methods of polymerization.

The polymeric dispersants aid in maintaining any nonsolubilized deposit removed by the Deposit Release Agent in a very finely divided state of subdivision. This prevents redeposition of such non-solubilized deposits, thus aiding in maintaining the heat transfer surfaces of the cooling system in good condition.

A BRIGHTENER

Additionally, a brightener or film former for solder is advantageous in the composition and for this purpose a minor percentile of an alkanol amine, preferably a dialkylaminoalkanol, is optionally utilized. Specifically a compound is used where the alkyl group is lower alkyl ($C_1$-$C_6$) and a specific example of such a solder protector is diethylaminoethanol.

Exemplary formulations illustrating the present invention are set out below. Numerical values are percent by weight.

| Formula I | | |
|---|---|---|
| | Deposit Release Agent | 85–98 |
| | Surfactant 15-2 | |
| Formula II | | |
| | Deposit Release Agent | 75–90 |
| | Surfactant | .5–5 |
| | Reducing Agent | 5–20 |
| Formula III | | |
| | Deposit Release Agent | 65–90 |
| | Surfactant | .5–5 |
| | Reducing Agent | 5–15 |
| | Polymeric Dispersant | .5–10 |
| Formula IV | | |
| | Deposit Release Agent | 50–80 |

-continued

| | |
|---|---|
| Surfactant | .5-5 |
| Reducing Agent | 5-15 |
| Polymeric Dispersant | .5-10 |
| Aminoalkanol | 5-20 |

As previously indicated, the above materials are dissolved in water to provide an aqueous concentrate which contains from 15–85% and preferably 15–50% by weight of the above formulas.

DOSAGE IN AUTOMOTIVE COOLING SYSTEMS

The above-described concentrates are utilized in a dosage ranging between 2–6 fluid ounces per gallon of coolant with a preferred dosage being about 4 fluid ounces per gallon.

The advantage cost-wise in extending the life of ethylene glycol-type coolants is accentuated by recent reports from the Organization of Petroleum Exporting Countries indicating that a gallon of antifreeze which sold in many parts of the United States for less than $2 in 1973 was now selling in some areas for $12.50 per gallon (cf. Business Week, Sept. 21, 1974, page 33).

Standard tests have indicated that the utilization of the cleaner will extend the life of ethylene glycol-type coolants in longevity and effectiveness.

EXAMPLES

EXAMPLE 1

Formula A

A preferred embodiment of multicomponent cleaner for use in automotive coolants is the following Formula A:

| Mix Order | Components | Wt.% |
|---|---|---|
| 1 | Soft Water (0.2 gpg TH) | 82.67 |
| 2* | Caustic, 50% solution calculated as 100% | 2.40 |
| 3 | Tolyltriazole, Solid | 1.00 |
| 4 | Mercaptobenzothiazole, Solid | 1.00 |
| 5 | Triton CF-10 (Rohm and Haas) Ethoxylated Nonylphenol (9 EtO) | 0.20 |
| 6 | Styrene Maleic Anhydride (mix for at least 45 minutes before adding the next component) | 0.50 |
| 7 | Sodium Gluconate 50%, calculated as 100% | 2.10 |
| 8 | Diethylaminoethanol | 1.20 |
| 9 | EDTA 82%, calculated as 100% | 5.00 |
| 10 | Thioglycolic Acid | 1.00 |
| 11 | Borax, 5 mol $H_2O$ (mix for at least 15 minutes before adding the next component) | 1.25 |
| 12 | Sodium Nitrite | 1.50 |
| 13 | Ucon Lub 50 HB 5100 (Union Carbide) | 0.10 |
| 14 | Antifoam, Dow A, Silicone (Dow Chemical) | 0.05 |
| 15 | Dye, Uranine C (Dow Chemical) | 0.03 |

*Advantageous to withhold 1% of caustic. Add the remaining components and then check solution pH. Then adjust the pH of the batch to 12.6.

Generalized procedure for Formula A. Each component was added in the mixing order shown above for A and each component was completely dissolved before the next sequential one was added. In the mixing, the water temperature was regulated to 120°F or below. Water hardness was also regulated to 0.2 grams per gallon of hardness or better. The mixing time, including step-by-step addition, was not less than 3 hours and an interval of 5 minutes was observed between adding each component. In the case of the styrene maleic anhydride polymer, which dissolves slowly, the mixture was stirred for 45 minutes before the next addition and lump formation was avoided by slow and careful addition of the polymer to the mix.

EXAMPLE 2
Scale Solubility Experiment--Engine Liner Scale

Solution Make-Up
- 250 ml D.I. Water
- 250 ml Ethylene Glycol
- 16 ml Formula A Cleaner
- 16 ml Corrosion Inhibitor having the following formula:

FORMULA B

| Necessary | Percent |
|---|---|
| Soft Water | 81.2 |
| Alkali Metal Nitrite | 3.0 |
| Alkali Metal Silicate | 3.5 |
| Alkali Metal Hydroxide (50% by wt. caustic) | 2.7 |
| Sulfur Containing Copper Inhibitor | 1.0 |
| Borax | 6.0 |
| Styrene Maleic Anhydride | 0.5 |
| Polymeric Dispersant | 0.3 |
| Optional | |
| Sodium Oleate | 2.0 |
| Sodium Carbonate | 2.0 |
| Antifoam | 0.1 |
| Diethylaminoethanol | 0.7 |
| Dye | 0.08 |

At use level (4 oz/gallon), the cooling system had the following dosage of Formula A and Formula B:

| | |
|---|---|
| Versene | 0.25% |
| 50% Gluconic Acid | 0.10% |
| Caustic | 0.04% |
| Triton CF-10 | 0.008% |

Additional components included:
- 410 ppm MBT and BZT (benzyltriazole)
- 160 ppm SMA, 80 ppm CMC
- 500 ppm Sodium oleate, 500 ppm DEAE
- 800 ppm $NaNO_2$, 400 ppm Borax
- 80 ppm Antifoam Experiment A weighed amount of scale was slurried at boiling under reflux for one week. The residue was filtered and submitted for X-ray fluorescence analysis. The table below shows analyses of the scales before and after cleaning.

TABLE I

| | Scale Solubility Experiments - Engine Liner Scale | | | | | | | |
|---|---|---|---|---|---|---|---|---|
| | 1 Engine Liner Scale (Cummins)* | | 2 Engine Liner Scale (Cummins) | | 3 Engine Liner Scale (Cummins) | | 4 Engine Liner Scale | |
| | Before | After | Before | After | Before | After | Before | After |
| $SiO_2$ | 6.0 | 29.5 | 4.2 | 19.8 | 26.0 | 38.2 | 1.6 | 7.1 |
| PbO | 13.7 | 6.2 | 3.0 | 1.1 | 2.6 | 1.6 | — | — |
| $SO_3$ | 0.7 | 0.5 | 0.9 | 0.5 | 2.6 | 1.3 | 1.2 | — |
| $K_2O$ | tr | 0.2 | — | — | — | — | — | — |
| MgO | 5.2 | 1.3 | 4.7 | 5.3 | 1.0 | 0.6 | 1.0 | 0.5 |
| CaO | 3.8 | 1.4 | 15.0 | 4.3 | 3.3 | 0.4 | 5.8 | 0.2 |
| CuO | — | — | — | — | 6.9 | 1.4 | tr | 0.1 |

TABLE I-continued

| | Scale Solubility Experiments - Engine Liner Scale | | | | | | | |
|---|---|---|---|---|---|---|---|---|
| | 1 Engine Liner Scale (Cummins)* | | 2 Engine Liner Scale (Cummins) | | 3 Engine Liner Scale (Cummins) | | 4 Engine Liner Scale | |
| | Before | After | Before | After | Before | After | Before | After |
| SnO | 0.7 | 4.5 | tr | 0.2 | 0.4 | 0.4 | — | — |
| $Na_2O$ | 12.0 | 4.6 | 1.3 | 1.7 | 1.5 | — | tr | 0.7 |
| $Cr_2O_3$ | tr | 0.2 | tr | 0.1 | 4.3 | 10.1 | tr | 0.4 |
| ZnO | 1.5 | 0.3 | 2.0 | 1.5 | 2.9 | 1.0 | — | — |
| BaO | 0.7 | 0.9 | 1.0 | 0.5 | — | 0.1 | — | — |
| $MnO_2$ | 0.3 | 0.2 | 0.9 | 1.3 | 0.3 | 0.3 | tr | 0.4 |
| $P_2O_5$ | 24.4 | 3.9 | 8.8 | 1.8 | 9.5 | 1.8 | 1.4 | 0.4 |
| $Al_2O_3$ | 0.7 | 1.7 | 0.6 | 1.3 | — | 0.8 | 1.5 | 1.3 |
| $Fe_2O_3$ | 1.3 | 4.6 | 6.0 | 9.4 | 2.6 | 7.7 | 73.8 | 73.4 |
| WT | 1.00 | .26 | 1.00 | 0.60 | 0.40 | 0.16 | 1.00 | .94 |

*The Cummins liners were obtained from Cummins Diesel Repair, Chicago.

Results: Compounds that were effectively dissolved were those containing Ca, Mg, Cu, Pb, Zn, Ba, and P.

Compounds which were only moderately or partly solubilized were those containing Fe, Si, Sn, Cr, Mn, and Al.

EXAMPLE 3A

1965 Chrysler Test Car Experiment

In order to determine whether or not extreme corrosion results from using a cleaner in an automotive cooling system, 600 ml of a cleaner similar to Formula A and 600 ml inhibitor (Formula B of Example 2) were added to the 1965 Chrysler test car which contained Western Transportation Company used ethylene glycol antifreeze. The car had a new water pump and new thermostat installed. Test corrosion bundles were also installed in the heater line. The car was started and run continuously from May 21, 1974, to May 25, 1974, which was a time duration of 85 hours. The total mileage registered was 1394 miles. The car was operated at 40 mph with the transmission in "drive." The car was in a stationary position with the drive shaft disconnected.

Results: The water pump was removed and examined. It proved generally clean with no major pitting or severe corrosion on the shaft or impeller blades. The housing was also clean showing no internal rust.

Samples of the coolant were taken before the test at 4 days and at 7 days to check the cleaning action.

| | PPM Ca | Mg | Total Fe | Sol Fe | Pb |
|---|---|---|---|---|---|
| Before Test | 70 | 62 | 12 | 0 | 21 |
| 4 days | 188 | 104 | 87 | 84 | 110 |
| 7 days | 191 | 102 | 80 | 80 | 140 |

Corrosion results after 7 days are shown below in duplicate.

| | Corrosion Rates - Mils Per year (MPI) | | | |
|---|---|---|---|---|
| 70:30 Solder | Cu | 97% Pb Solder | Fe | Al |
| 0,0 | 0,0 | 1.3, 1.5 | 3.3, 1.9 | 0,0 |

EXAMPLE 3B

1969 Oldsmobile Field Test

In order to determine the cleaning ability of a cleaner under actual driving conditions, 18 oz. of the cleaner utilized in Example 3A and 18 oz. of inhibitor (Formula B of Example 2) were added to the cooling system (18 quarts) to give a dosage of 4 oz/gallon. Samples were taken periodically for pH, residual deposit cleaner, Ca, Mg, Pb, and Fe.

Results: After 1 day the residual deposit cleaner level was zero. Cleaning action appeared to stabilize after 2 days. No deleterious effects of the cleaner were observed after 5 weeks of use.

TABLE II

| | 1969 Oldsmobile Field Trial Analytical Results | | | | | | | | | | |
|---|---|---|---|---|---|---|---|---|---|---|---|
| | | | | | Days of Cleaning | | | | | | |
| | Before | 1 | 2 | 3 | 4 | 7 | 9 | 14 | 21 | 28 | 35 |
| pH | 8.1 | 9.0 | 9.0 | 9.0 | — | — | 10.5 | 10.25 | — | 9.3 | 9.8 |
| Residual) Deposit ) Cleaner ) | — | 0 | 0 | 0 | — | — | 0 | 0 | 0 | 0 | 0 |
| ppm Cu | — | — | — | — | — | — | 5 | 7 | 5 | 6 | 8 |
| ppm Ca (total) | 28 | 158 | 190 | 165 | 113 | 122 | — | — | — | — | — |
| ppm Ca (sol) | 0 | 137 | 129 | 128 | 45 | 44 | 64 | 60 | 52 | 53 | 49 |
| ppm Mg (total) | 43 | 75 | 157 | 111 | 165 | 186 | — | — | — | — | — |
| ppm Mg (sol) | 6 | 43 | 35 | 35 | 8 | 8 | 7 | 5 | 4 | 3 | 3 |
| ppm Fe (total) | 86 | 145 | 383 | 190 | 320 | 640 | — | — | — | — | — |
| ppm Fe (sol) | 2 | 76 | 72 | 60 | 51 | 38 | 7 | 7 | 7 | 5 | 5 |
| ppm Pb (sol) | 10 | 88 | 160 | 150 | 150 | 180 | 180 | 190 | 210 | 207 | 227 |

TABLE II-continued

| | 1969 Oldsmobile Field Trial Analytical Results | | | | | | | | | |
|---|---|---|---|---|---|---|---|---|---|---|
| | | | | Days of Cleaning | | | | | | |
| | Before | 1 | 2 | 3 | 4 | 7 | 9 | 14 | 21 | 28 | 35 |
| ppm suspended solids | 388 | 610 | 1250 | 1170 | 1530 | 3330 | 810 | 1060 | 3180 | 2560 | 1570 |

(—) not determined

CONCLUSIONS

All of the coolants removed from the test engines or from the experiments were visually examined and found to contain finely divided suspended particles of removed deposits. All of these coolant samples were filtered using laboratory glassware and standard laboratory filter paper. In each instance none of the suspended materials were removed by the filter paper but passed through.

The samples were again refiltered and could only be collected using $<1.0\mu$ millipore filters. This clearly indicates the very fine state of subdivision of any suspended material contained in the coolant after treatment with the cleaners of the invention. Further, the physical examination of the suspended material collected on the millipore filters showed it to be extremely light and fluffy and contained virtually no abrasive crystalline type material. This is important, since such finely divided fluffy type suspensions easily pass through small orifices contained in the cooling system and do not tend to produce scoring or abrasion of water pumps.

The cleaners of the invention are adapted to be compatible with various types of corrosion inhibitors and supplement their normal activity in that they slowly remove deposits and provide fresh metal surfaces upon which the inhibitors can act to prevent corrosion.

The inhibitors of the invention do not interfere with the normal cooling action of coolants such as water or water/ethylene glycol mixtures.

Throughout the specification and appended claims, the invention is described and claimed with respect to automotive cooling systems. It is understood that the expression "automotive cooling systems" also embraces the cooling systems of other internal combustion engines, specifically diesel engines of the type used to power large trucks and railway locomotives as well as so-called stationary diesel engines used as in power generating applications.

Also, where used in the present specification and claims, the term "glycol" means ethylene or propylene glycol as it is conventionally used in the trade.

From the examples, it is apparent that the present invention provides a cleaner that is compatible with both water and water/glycol type inhibitors. It is capable of removing deposits from automobile engine cooling systems and dispersing them in form that is harmless to the various components of the cooling system. Most importantly, it is not necessary to drain the system to remove the inhibitor, but rather the inhibitor may remain with the coolant so long as it is used in the cooling system.

BIBLIOGRAPHY

U.S. Pat. No. 2,544,649 Bersworth; Teaches triethanolamine and EDTA in an alkaline medium.

U.S. Pat. No. 2,723,956 Johnson (National Aluminate); Styrene maleic anhydride (SMA) for reducing scale in steam boilers.

U.S. Pat. No. 2,802,788 Flaxman (Wilco); EDTA-type reagents for cleaning in an automotive cooling system utilized at an optimum pH of 7.0–7.5.

U.S. Pat. No. 2,877,188 Liddell (Hagan Chemicals); Mercaptobenzothiazole as a copper inhibitor.

U.S. Pat. No. 3,079,343 Bernard (Pure Oil); Triethanolamine corrosion inhibitor and aminopolycarboxylic acid with glycol.

U.S. Pat. No. 3,116,105 Kerst (Dearborn Chemical); Column 2 of the patent teaches aminopolycarboxylic acid together with a hydroxycarboxylic acid and a nonionic surfactant utilized for corrosion inhibition.

U.S. Pat. No. 3,419,501 Levy (Chrysler); Composition for cleaning the cooling system of an internal combustion engine and includes an aminopolycarboxylic acid.

U.S. Pat. No. 3,708,436 Thompson et al (Nalco Chemical); Teaches polymeric maleic anhydride combined with sodium nitrilotriacetate (NTA) and also including styrene maleic copolymers for a detergent builder.

Defensive Publication T903,010 Katstra (Continental Oil); Non-ionic surfactant in combination with an alkaline cleaning compound or an aminopolycarboxylic acid.

Bregman, *Corrosion Inhibitors*, McMillan Company, 1970, "Automotive Cooling Systems," pages 147–153.

Butler et al, *Corrosion and Its Prevention in Waters*, Lenard Hill, London, 1966, "Engine Cooling Systems," pages 188–191.

Prescott et al, "Acid and Its Derivatives," *Ind. and Eng. Chem.*, 45:338–342, February 1953.

"Auto Coolant Controversy Boils Over," *Chemical Week*, July 17, 1974.

What is claimed is:

1. An extended life liquid cleaner for automotive cooling systems comprising from 15–85% by weight of water and from 85–15% by weight of a composition consisting essentially of
   A. An aminopolycarboxylic acid
   B. An α hydroxy carboxylic acid
   C. An azole copper protector selected from the group consisting of mercaptobenzothiazole and a monobenzotriazole with the ratio of A:B:C being within the range of from 3:1:1 to 2:1:1, said liquid cleaner having an alkaline pH.

2. The cleaner according to Claim 1 having a pH of from 7.5–12.6.

3. An extended life liquid cleaner for automotive cooling systems comprising from 50–85% by weight of water and from 50–15% by weight of a composition consisting essentially of
   A. An aminopolycarboxylic acid
   B. An α hydroxy carboxylic acid C. An azole copper protector selected from the group consisting of mercaptobenzothiazole and a monobenzotriazole with the ratio of A:B:C being within the range of from 3:1:1 to 2:1:1, said liquid cleaner having a pH of from 7.5–12.6.

4. An extended life liquid cleaner for automotive cooling systems comprising from 50–85% by weight of water and from 50–15% by weight of a composition consisting essentially of

| Ingredients | % by Weight |
|---|---|
| I. Deposit Release Agent consisting essentially of | 98–85 |
| A. An aminopolycarboxylic acid | |
| B. An α hydroxy carboxylic acid | |
| C. An azole copper protector selected from the group consisting of mercaptobenzothiazole and a monobenzotriazole with the weight ratio of A:B:C being within the range of from 3:1:1 to 2:1:1 | |
| II. A non-ionic surfactant capable of producing an emulsion | 2–15 | said liquid cleaner having a pH of from 7.5–12.6.

5. An extended life liquid cleaner for automotive cooling systems comprising from 50–85% by weight of water and from 50–15% by weight of a composition consisting essentially of

| Ingredients | % by Weight |
|---|---|
| I. Deposit Release Agent consisting essentially of | 90–75 |
| A. An aminopolycarboxylic acid | |
| B. An α hydroxy carboxylic acid | |
| C. An azole copper protector selected from the group consisting of mercaptobenzothiazole and a monobenzotriazole with the weight ratio of A:B:C being within the range of from 3:1:1 to 2:1:1 | |
| II. A non-ionic surfactant capable of producing an emulsion | .5–5 |
| III. Reducing Agent suitable to reduce ferric to ferrous ion | 5–20 | said liquid cleaner having a pH of from 7.5–12.6.

6. An extended life liquid cleaner for automotive cooling systems comprising from 50–85% by weight of water and from 50–15% by weight of a composition consisting essentially of

| Ingredients | % by Weight |
|---|---|
| I. Deposit Release Agent consisting essentially of | 90–65 |
| A. An aminopolycarboxylic acid | |
| B. An α hydroxy carboxylic acid | |
| C. An azole copper protector selected from the group consisting of mercaptobenzothiazole and a monobenzotriazole with the weight ratio of A:B:C being within the range of from 3:1:1 to 2:1:1 | |
| II. A non-ionic surfactant capable of producing an emulsion | .5–5 |
| III. Reducing Agent suitable to reduce ferric to ferrous ion | 5–15 |
| IV. Polymeric Dispersant which is a water-soluble carboxylic acid polymer having an average molecular weight between 1,000 to 1,000,000 | .5–10 | said liquid cleaner having a pH of from 7.5–12.6.

7. An extended life liquid cleaner for automotive cooling systems comprising from 50–85% by weight of water and from 50–15% by weight of a composition consisting essentially of

| Ingredients | % by Weight |
|---|---|
| I. Deposit Release Agent consisting essentially of | 85–50 |
| A. An aminopolycarboxylic acid | |
| B. An α hydroxy carboxylic acid | |
| C. An azole copper protector selected from the group consisting of mercaptobenzothiazole and a monobenzotriazole with the weight ratio of A:B:C being within the range of from 3:1:1 to 2:1:1 | |
| II. A non-ionic surfactant capable of producing an emulsion | .5–5 |
| III. Reducing Agent suitable to reduce ferric to ferrous ion | 5–15 |
| IV. Polymeric Dispersant which is a water-soluble carboxylic acid polymer having an average molecular weight between 1,000 to 1,000,000 | .5–10 |
| V. Aminoalkanol wherein the number of carbon atoms in the alkanol chain is $C_1$–$C_6$ | 5–20 | said liquid cleaner having a pH of from 7.5–12.6.

8. A glycol coolant for automotive cooling systems which contains additionally 2–6 ounces of the following aqueous cleaner composition per gallon of coolant:

A. An aminopolycarboxylic acid

B. An hydroxy carboxylic acid

C. An azole copper protector selected from the group consisting of mercaptobenzothiazole and a monobenzotriazole with the ratio of A:B:C being within the range of from 3:1:1 to 2:1:1, said composition having an alkaline pH and wherein the combined ratio of A, B, and C to water is from about 15:85 to 85:15.

9. The coolant according to Claim 8 which contains about 4 ounces of the composition per gallon of coolant.

10. The coolant according to Claim 8 wherein the composition has a pH of from 7.5–12.6.

11. The coolant according to Claim 10 wherein the composition additionally contains a non-ionic surfactant.

12. The coolant according to Claim 10 wherein the composition additionally contains a non-ionic surfactant and a reducing agent suitable to reduce ferric to ferrous ion.

13. The coolant according to Claim 10 wherein the composition additionally contains a non-ionic surfactant, a reducing agent suitable to reduce ferric to ferrous ion, and a polymeric dispersant which is a water-soluble carboxylic acid polymer having an average molecular weight between 1,000 to 1,000,000.

14. The coolant according to Claim 10 wherein the composition additionally contains a non-ionic surfactant, a reducing agent suitable to reduce ferric to ferrous ion, a polymeric dispersant which is a water-soluble carboxylic acid polymer having an average molecular weight between 1,000 to 1,000,000, and aminoalkanol wherein the number of carbon atoms in the alkanol chain is $C_1$–$C_6$.

* * * * *